W. W. DUDLEY.
CENTER WHEEL FOR WATCHES.
APPLICATION FILED APR. 19, 1911.

1,037,740.

Patented Sept. 3, 1912.

WITNESSES
Russell W. Dudley
A. F. Hayes

INVENTOR
William W. Dudley.
by Chas. J. Williamson
Attorney

UNITED STATES PATENT OFFICE.

WILLIAM W. DUDLEY, OF LANCASTER, PENNSYLVANIA, ASSIGNOR TO HAMILTON WATCH COMPANY, OF LANCASTER, PENNSYLVANIA.

CENTER WHEEL FOR WATCHES.

1,037,740.  Specification of Letters Patent.  Patented Sept. 3, 1912.

Application filed April 19, 1911. Serial No. 622,070.

*To all whom it may concern:*

Be it known that I, WILLIAM W. DUDLEY, of Lancaster, in the county of Lancaster, and in the State of Pennsylvania, have invented a certain new and useful Improvement in Center Wheels for Watches, and do hereby declare that the following is a full, clear, and exact description thereof.

A construction in common use for connecting the center wheel and the center arbor of watches is one wherein the arbor is provided with a collar with a portion of its periphery flattened, and the center wheel is provided with a similarly shaped opening to receive said collar. A serious objection to such a construction as this, especially when the center wheels are stamped and truing of said opening is necessary, is the impossibility of so truing the center opening, and hence the center wheel must be thrown away.

The object of my invention is to provide such a connection between the center wheel and its arbor as will as perfectly answer the purpose as the objectionable one above described and yet will render possible the truing of the wheel opening when it may be required.

Figure 1:
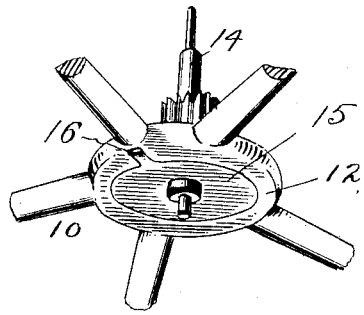
Figure 2:
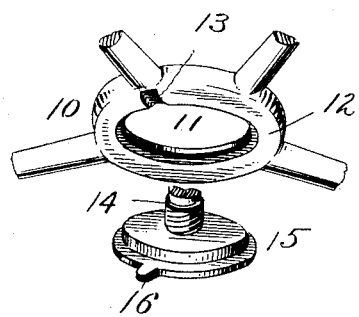
Figure 3:
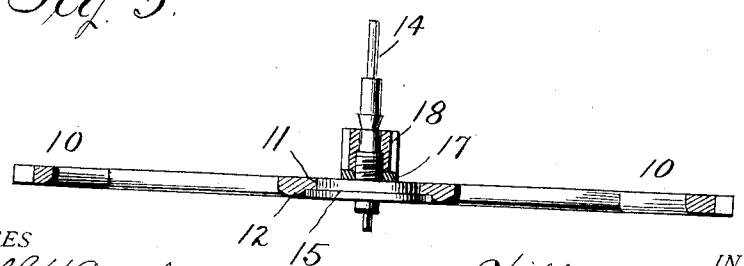

In the accompanying drawings—Figure 1 is a perspective view of a combined center wheel and arbor embodying my invention; Fig. 2 a similar view with the parts separated; and Fig. 3 a section parallel with the axis of the arbor, with the parts assembled.

In the embodiment of my invention illustrated in the drawings, the center wheel 10 is a stamped one having a central opening 11 that is perfectly round, and upon one side of the wheel there is an annular offset 12 forming a sort of hub which has a radially extending recess or notch 13 in its outer face. The center arbor 14 has near one end an annular collar 15 of a diameter snugly to fit said hub-like offset, and radially projecting from said collar is a lug or tooth 16 adapted to fit the radial recess or notch 13 in said hub. The internal diameter of the hub-like offset is slightly greater than the diameter of the center hole of the wheel so that a shoulder or seat is formed for the collar 15 to abut against, and the arbor has at the inner side of the collar 15 an enlargement that fits said center opening.

Upon the opposite side of the wheel from that having the annular offset 12, a washer 17 is placed upon the arbor and bears against such side of the wheel, and screwed upon the arbor, as is usual, is a cannon pinion 18 by which the parts of the wheel and arbor are secured in their assembled relation.

It will be evident that by my invention is secured the important advantages of simplicity and economy of construction; there are no disadvantages, such as accrue from the use of non-circular or irregular center opening in the wheel; and there is no impairment whatever of the efficiency of the structure.

Having thus described my invention what I claim is—

As an improvement in time pieces, the combination of a center wheel having a round central opening with a notch extending outward from the opening and a center arbor passing through said opening having a collar larger than the wheel opening provided with an outwardly extending tooth or lug that enters said notch, the arbor having adjacent said collar a portion fitting the round center opening in the wheel, a pinion on the side of the wheel opposite said collar, and a threaded connection between said pinion and said arbor.

In testimony that I claim the foregoing I have hereunto set my hand.

WILLIAM W. DUDLEY.

Witnesses:
  RUSSELL H. DUDLEY,
  CHAS. J. WILLIAMSON.

Copies of this patent may be obtained for five cents each, by addressing the "Commissioner of Patents, Washington, D. C."